May 21, 1968 H. E. ROLLINS 3,384,330
FLEXIBLE WING VEHICLE APEX
Filed July 1, 1966 2 Sheets-Sheet 1
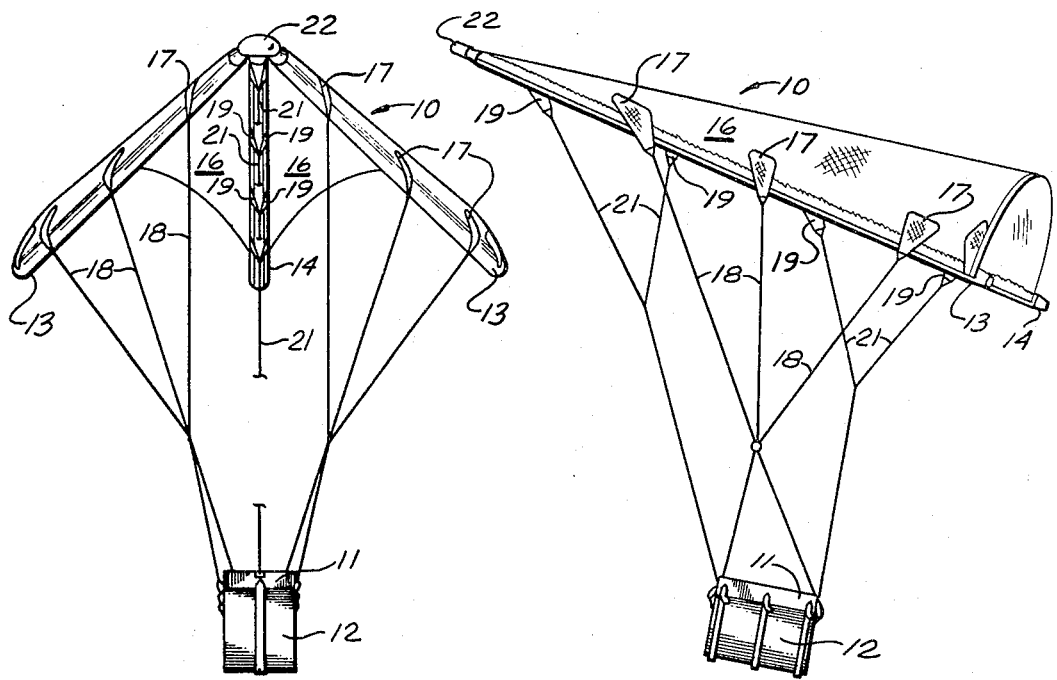
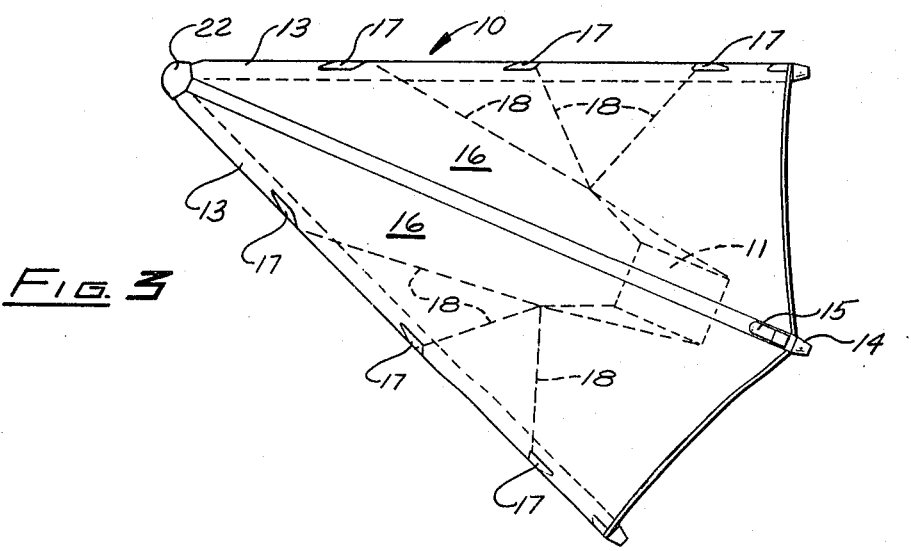
INVENTOR.
HARRY E. ROLLINS
BY Richard D. Seibel
ATTORNEY

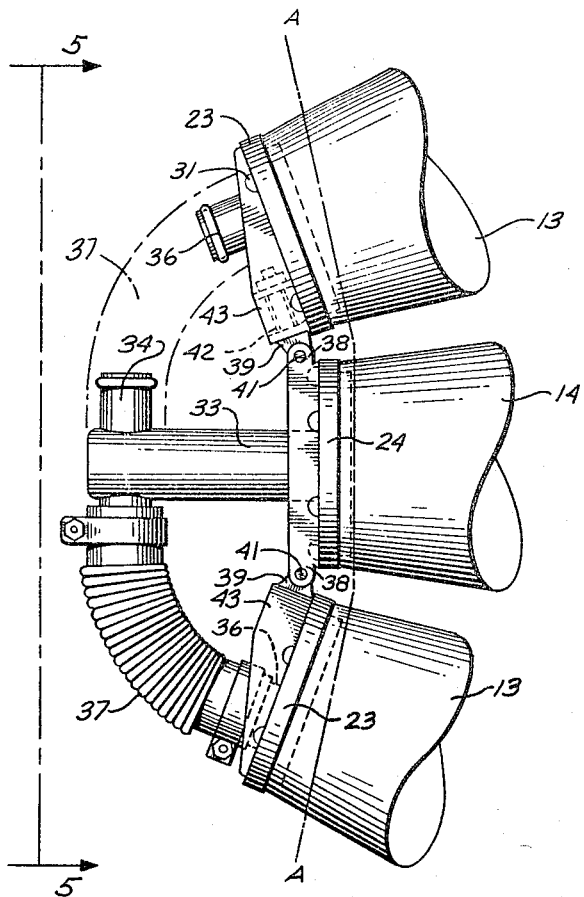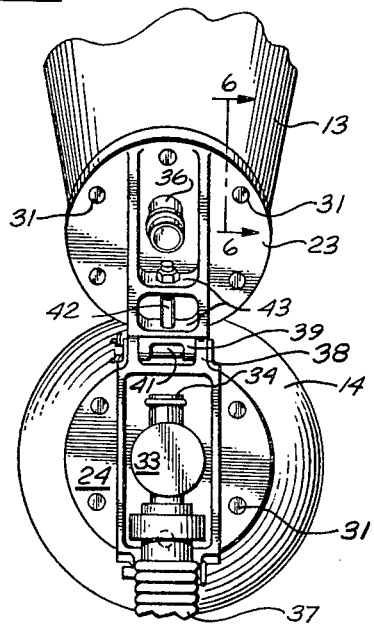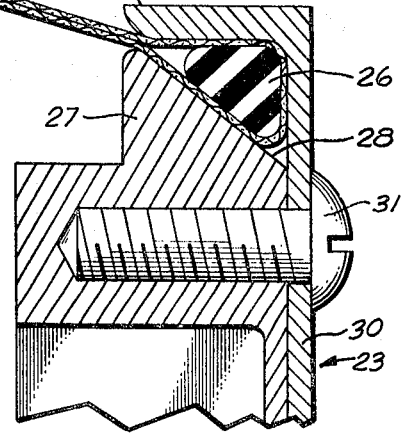

United States Patent Office 3,384,330
Patented May 21, 1968

3,384,330
FLEXIBLE WING VEHICLE APEX
Harry E. Rollins, Fullerton, Calif., assignor to North American Rockwell Corporation, a corporation of Delaware
Filed July 1, 1966, Ser. No. 562,138
11 Claims. (Cl. 244—46)

ABSTRACT OF THE DISCLOSURE

An apex for a flexible wing gliding vehicle comprising three inflatable flexible booms forming a rigidifiable trifurcated frame and a fabric sail between the booms is described. The end of each boom is closed with a rigid piece and these are interconnected at the vehicle apex for universal relative angular motion. Clevis and pivot pin linkages are arranged between pairs of booms to provide pivotal freedom about two axes. A gas manifold also communicates with the interior of the three booms for inflation thereof.

---

In recent years considerable interest has been shown in inflatable flexible wing vehicles for providing gliding flight in the atmosphere. Such vehicles are employed for landing payloads from an aircraft, for example, at a selected site by controlling the glide path of the vehicle to the site. The lift of such a vehicle can be controlled for control of the flight range and the aerodynamic characteristics of the vehicle can be modified in flight to provide steering. As the aerodynamic characteristics are changed, the geometry of the vehicle may change to accommodate the changed loads caused. In order to keep bending moments on inflated portions of the vehicle at a low value, relative motion between inflated portions is desirable.

It is therefore a broad object of this invention to provide an aerodynamic vehicle with means for accommodating changes in geometry.

Thus in the practice of this invention according to a preferred embodiment there is provided an inflatable trifurcated frame having a flexible sail attached like a web to the branches thereof to form an aerodynamic body. A payload is suspended from the aerodynamic body by a plurality of riser lines secured therebetween. The frame of the aerodynamic body is fabricated of three substantially similar inflatable booms. The booms each have a rigid end fitting at the forward end and the three end fittings on the three booms are interconnected by hinge-like joints that permit articulation of the booms. Thus, for example, a pin joint is provided between two booms to permit relative angular motion therebetween in a common plane, and a second pin joint is provided to permit the booms to pivot out of a common plane. Thus each pair of booms is articulatable about two mutually angulated axes.

Thus it is a broad object of this invention to provide an improved aerodynamic vehicle.

It is another object of this invention to provide an improved apex interconnection for an aerodynamic vehicle.

Other objects and many of the attendant advantages of this invention will be readily appreciated as the same becomes better understood by reference to the following detailed description when considered in connection with the accompanying drawings wherein:

FIG. 1 illustrates a side view of a vehicle constructed according to the principles of this invention;
FIG. 2 illustrates a front view of the vehicle of FIG. 1;
FIG. 3 illustrates a top view of the vehicle of FIG. 1;
FIG. 4 illustrates a detailed view of the apex connection of the vehicle of FIG. 1;
FIG. 5 is a partial front view of the apex connection of FIG. 4; and
FIG. 6 is a partial cross section of the connection between a flexible boom and a rigid end fitting.

Throughout the drawings like numerals refer to like parts.

Additional details of a flexible wing vehicle are described and claimed in copending U.S. patent application Ser. No. 562,139, entitled, "Flexible Wing Vehicles" by A. F. Cumming, A. B. Miller, W. T. Neal, and H. E. Rollins, assigned to North American Aviation, Inc., the assignee of this invention.

FIG. 1 illustrates an aerodynamic vehicle incorporating the principles of this invention. As illustrated in this embodiment there is provided an aerodynamic body or wing 10 from which is suspended a control platform 11 to which is secured a payload 12 by conventional means such as straps. The aerodynamic body 10 comprises a trifurcated frame having two leading edge booms 13 and a keel boom 14 therebetween in a substantailly crowfoot shape with three branches. The two leading edge booms 13 and the keel boom 14 are attached together at the leading end of the aerodynamic body 10 and diverge toward the trailing end. During gliding flight with no turn, the three booms lie substantially in a single plane. As pointed out hereinafter, during turning maneuvers, the booms may move out of a common plane.

A fabric sail 16 is secured between each of the leading edge booms 13 and the keel boom 14 to provide a lifting surface. The booms 13 and 14 are formed of flexible inflatable tubes and, during gliding flight, are inflated to a sufficient pressure to remain rigid under aerodynamic loads. A convenient location for a conventional pressurization system 15 is atop the aft end of the keel boom 14. Under aerodynamic loading the sail 16 forms high lobes between the rigidified booms and supports the vehicle in the atmosphere. By trimming the body 10 to have a positive angle of attack, a good lift over drag ratio is obtained for prolonged gliding flight and gentle landing of payloads.

A plurality of leading edge gussets or splice sheets 17 are secured to the sail 16 adjacent the leading edge booms 13 and a plurality of leading edge riser lines 18 are secured between the gussets 17 and the control platform 11. Keel gussets 19 are secured in pairs to the sail adjacent the central or keel boom 14 of the aerodynamic body with keel gussets located symmetrically on either side of the boom so that the loads are symmetrical. Keel riser lines 21 extend between the keel gussets 19 and the control platform 11. The riser lines 18 and 21 support the control platform 11 and payload 12 from the aerodynamic body 10.

In order to keep the pressurization required in the booms at a low value and to keep the booms a relatively small diameter so as not to interfere with smoth airflow of a gliding vehicle, it is desirable to keep the bending stresses on the booms at a relatively low value. When the bending stresses are at a high value the booms will buckle and the aerodynamic properties of the gliding vehicle would be destroyed. The bending moments along the length of the booms are minimized by securing the riser lines 18 and 21 directly to the sail 16 by means of the gussets 17 and 19 respectively. Since the principal aerodynamic loads are on the sail and these are transmitted directly to the control platform 11 by way of the riser lines, there are no highly localized loads on the booms that may cause buckling. With such an arrangement the loads applied to the booms by the sail and riser lines are spread over appreciable lengths of the booms and it is found that a relatively small diameter boom with relatively low pressurization will remain rigid.

One of the principal locations for high bending moments in a trifurcated gliding vehicle such as illustrated is at the forward apex where the three booms are interconnected. In prior art vehicles of the general type described and illustrated a substantially rigid interconnection between the booms at the apex has been employed. Rigid booms have been secured to a rigid apex member or inflatable booms have been interconnected by an inflatable connection that is substantially rigid during gliding flight and subject to high bending moments that may cause buckling near the apex under aerodynamic loads.

In order to minimize bending loads at the substantially rigid apex in prior art vehicles, so-called spreader bars have been employed between the booms. The spreader bar is a rigid or rigidifiable member attached to both leading edge booms and the keel boom at a point about one-third of the wing length from the aft end of the wing. The spreader bar interferes with aerodynamic flow during flight and increases the drag of the vehicle. In addition, a substantial bending moment is present on the booms where the spreader bar attaches.

As an aerodynamic vehicle of the type described and illustrated glides and undergoes various maneuvers, the aerodynamic load on the sail changes in magnitude and distribution. Under these conditions the sail which forms arching lobes between the booms "breathes." The so-called breathing of the sail involves a change in height of the lobes and necessarily a change in the angle between the booms in a plane common to the three booms. As described hereinafter the booms are interconnected by pin joints which offer no resistance to a moment, the angle between the booms can readily change and no bending moments are applied at the ends of the booms.

Similarly when the aerodynamic vehicle turns or banks in flight, the aerodynamic loads on the portion of the sail between one leading edge boom and the keel boom is different from the aerodynamic load on the portion of the sail between the other leading edge boom and the keel boom. This may cause the leading edge booms to rise or fall relative to the keel boom in a manner that may not be symmetrical on either side of the keel boom, that is the three booms may no longer lie in a common plane. Such motion is readily accommodated by pivoting around a second set of pivot pins between each of the leading edge booms and the keel boom as described hereinafter and no bending moments are applied at the ends of the booms.

It is found that a rigid apex and spreader bars are not required since, despite the articulated interconnection between the booms at the apex, the vehicle is stable. Air flow during gliding inflates the sail in a manner somewhat similar to inflation of a parachute and tends to cause a spread between the booms. Conversely the force of the riser lines supporting the payload tends to draw the booms together. During gliding flight these forces are balanced and an equilibrium flight geometry is obtained. This equilibrium flight geometry differs for differing flight conditions and the articulated apex permits the aerodynamic body to achieve the equilibrium geometry without bending moments being introduced at the ends of the booms thereby minimizing the possibility of buckling.

Thus in a preferred embodiment the keel boom 14 is connected to the two leading edge booms 13 by an interconnection that permits articulation in each of two mutually angulated directions. FIGS. 4 and 5 illustrate an articulated apex connection incorporating the principles of this invention wherein the apex protective cover 22 shown in FIGS 1–3 has been removed for purposes of illustration. A line A—A in FIG. 4 indicates the rearward extent of the protective cover 22 which is preferably formed of foamed polyurethane plastic in a smooth aerodynamic shape. The cover 22 is readily installed on the wing by conventional straps and lacing (not shown) to permit easy access to the end closures and pressure line manifold hereinafter described. Each of the leading edge booms 13 terminates in a rigid lateral end closure 23. The keel boom 14 terminates in a rigid central end closure 24. The rigid end closures 23 and 24 are each secured to the flexible booms 13 and 14 respectively as is illustrated in more detail in FIG. 6 which illustrates a typical interconnection between a leading edge boom 13 and a lateral end closure 23.

As illustrated in FIG. 6 the end of the inflatable boom 13 has a short conical section with a peripheral enlargement at the end thereof which comprises a rubber O-ring 26 having a portion of the fabric boom 13 wrapped therearound. After the fabric of the boom is wrapped around the O-ring it is cemented or stitched to itself to enclose the O-ring and form a resilient peripheral enlargement on the end of the flexible boom. A rigid plate 27 which in a preferred embodiment is made from aluminum is fitted within the flexible tube 13 and has an external diameter larger than the O-ring 26 to provide a relatively close fit within the inside of the flexible boom near the O-ring 26 for good sealing. The plate 27 serves to seal the end of the flexible member and may contain a pneumatic connection such as a valve or tube (not shown in FIG. 6). The plate 27 is readily assembled in the flexible boom because of the resilience and flexibility of the O-ring.

A chamfer 28 is provided on the metal plate 27 around the periphery thereof. The chamfer in a preferred embodiment extends between the outer diameter of the plate and one face thereof at about a 45° angle and serves as a seat for the peripheral enlargement on the end of the boom.

A rigid ring 29 is fitted over the external diameter of the metal plate 27 and has an internal diameter greater than the external diameter of the plate to provide sufficient clearance for the doubled thickness of fabric at the end of the boom. An inwardly extending flange 30 is provided on one side of the ring 29 and the flange 30 is secured to the metal plate 27 by a plurality of bolts 31. As illustrated in this embodiment the flange 30 may have mechanical connections secured thereto. The ring 29 and flange 30 and the chamfer 28 on the plate 27 cooperate to define a peripheral enclosure therebetween. The enclosure has a substantially triangular cross-section that is smaller than a triangle that would exactly circumscribe a circle having the diameter of the O-ring 26 so that the normally circular cross-section of the O-ring is deformed into a flattened three-sided figure when the O-ring is contained within the peripheral enclosure. In this manner the peripheral enlargement on the end of the flexible boom 13 is sealed against the rigid plate 27 and the boom can be pressurized without substantial leakage. The central end closure 24 on the keel boom 14 is substantially similar to the end closure 23 except for the type and location of mechanical and pneumatic connections secured thereto.

Referring again to FIGS. 4 and 5, the central end closure 24 has an axial tube 33 extending therefrom with a T-connection 34 at the opposite end thereof. The tube 33 communicates with the interior of the boom and is conveniently secured to and through a plate 27 (FIG. 6) rather than a flange 30 of the end closure. The two lateral end closures 23 each have a tube 36 extending from the plate 27 (FIG. 6) through the flange 30 and communicating with the interior of the leading edge boom 13. The tubes 36 are preferably displaced from the axis of the leading edge booms to allow space for the clevis interconnection hereinafter described. A flexible tube 37 interconnects each of the tubes 36 on the lateral end closures with the T-connection 34 on the central end closure to form a gas manifold. Thus the interior of the keel boom 14 is in gas communication with the interior of each of the leading edge booms 13. Because of the relatively small diameter of the flexible tube 37 compared with the booms, the flexible tubes 37 have a very low resistance to flexure and the three booms can articulate with a minimum of resistance.

As is more clearly seen in FIG. 5 the central end closure 24 has a clevis frame 38 fixedly secured or integrally formed at either side thereof. FIG. 5 illustrates the central end closure 24 and one of the lateral end closures 23 and it will be understood that an identical interconnection is made between the central end closure and the other lateral end closure. A clevis insert 39 that is attached to the lateral end closure 23 as described below, is fitted within the clevis frame 38 and fastened thereto by a clevis pin 41 so that the clevis insert can rotate or pivot relative to the clevis frame about an axis normal to the axis of the keel boom 14. The leading edge boom 13 is thus attached to the keel boom 14 by a hinge-like or pin joint and the angle between the two booms is free to change about the axis of pin 41 under varying flight condititons merely by pivoting about the pin joint. Since the booms are connected by a pin joint, there is no moment transfer therebetween and no buckling problem.

The clevis insert 39 is a T-shaped member having the clevis pin 41 passing through upstanding ears on the top of the T and having a pivot pin 42 forming the leg of the T. The pivot pin 42 passes through and is journaled in a pivot frame 43 that is fixedly secured to the lateral end closure 23 preferably on a flange 30. The pivot frame 43 is free to rotate about the pivot pin 42 about an axis normal to the axis of the clevis pin 41. The leading edge boom 13 is thus attached to the keel boom 14 with two degrees of pivotal freedom by hinge-like joints or pin joints and the pitch of the booms is free to change under varying flight conditions merely by pivoting around the pin joints. Since the booms are connected by pin joints, there is no moment transfer therebetween and no buckling problem.

Thus the booms are attached together at the apex of the vehicle in such a manner that there can be no translation therebetween, but rotation is permitted in two degrees of freedom. The only rotational freedom restrained is relative twisting of the booms about the boom axis, and this is of slight consequence since there is no substantial buckling moment due to such restraint. The angle between the leading edge booms and the keel boom can vary within a plane containing the three booms by rotation around the clevis pin 41. Likewise the leading edge booms can rotate in a second degree of freedom by departing from a plane containing all three booms by rotation around the pivot pin 42. Thus the three booms are mutually articulable about mutually angulated axes, the sail can breathe during flight, and twisting of the vehicle from bilateral symmetry can be accommodated, all without buckling of the booms.

Obviously many modifications and variations of the present invention are possible in light of the above teachings. It is therefore to be understood that within the scope of the appended claims the invention may be practiced otherwise than as specifically described.

What is claimed is:
1. A flexible wing vehicle comprising:
   a trifurcated frame having a central branch and two side branches intersecting at their ends to form an apex in a substantially crowfoot shape;
   a flexible sail attached to each of the branches of said frame along the lengths thereof to form a web therebetween;
   means including a plurality of rigid elements forming a connection between the side branches and the central branch at said apex for relative angular motion between each of the side branches and the central branch under changed aerodynamic loading.
2. A flexible wing vehicle as defined in claim 1 wherein the branches of said frame are interconnected at the apex of said frame for relative angular motion between the branches in a plane defined by the central branch and at least one side branch.
3. A flexible wing vehicle as defined in claim 1 wherein the branches of said frame are interconnected at the apex of said frame for relative angular motion of the branches from a plane defined by the central branch and at least one side branch.
4. A flexible wing vehicle as defined in claim 1 wherein the branches are interconnected at the apex of said frame for universal relative angular motion.
5. A flexible wing vehicle as defined in claim 4 wherein said connection comprises:
   a first joint connection between the central branch and one of the side branches for pivoting in a plane defined by the central branch and at least one side branch; and
   a second pin joint connection between the central branch and one of the side branches for pivoting one of the branches out of a plane defined by the central branch and at least one side branch.
6. A flexible wing vehicle as defined in claim 1 wherein the branches of said frame are inflatable booms; and further comprising flexible gas connections between the branches of said frame.
7. A flexible wing vehicle as defined in claim 6 wherein said flexible booms each have a rigid end closure at the apex of said frame; and wherein said connection comprises a hinge-like connection between said rigid end closures.
8. A flexible wing vehicle as defined in claim 7 wherein said gas connections comprise:
   a T shaped tube on the end closure of the central boom in gas communication with the interior of the central boom;
   a tube on the end closure of each of the side booms in gas communication with the interior of the side booms;
   a flexible tube connecting each of said tubes on the side booms with said T shaped tube.
9. A flexible wing vehicle as defined in claim 7 wherein said hinge-like connection comprises:
   a clevis frame on the end closure on a first one of said booms;
   a clevis insert in said clevis frame and connected to the end closures on a second one of said booms;
   a clevis pin connecting said clevis frame and said clevis insert for pivotal motion about an axis normal to the axis of one of said booms.
10. A flexible wing vehicle as defined in claim 9 wherein said hinge-like connection further comprises:
   a pivot frame on the end closure of the second one of said booms; and
   a pivot pin attached to said clevis insert normal to said clevis pin and attached for pivotal movement in said pivot frame.
11. A flexible wing vehicle comprising:
   a flexible sail;
   first, second and third booms converging at the forward end of the wing secured to the sail for main- taining sail configuration; and
articulated apex means interconnecting the booms for relative pivotal motion wherein said apex means comprises a first pivot structure connecting the first and second booms with two degrees of freedom, and a second pivot structure connecting the second and third booms with two degrees of pivotal freedom.

References Cited

UNITED STATES PATENTS

| | | | |
|---|---|---|---|
| 3,141,640 | 7/1964 | Sutliff et al. | 244—138 |
| 3,198,458 | 8/1965 | Fink | 244—49 |
| 3,212,730 | 10/1965 | Tschudy et al. | 244—1 |
| 3,275,271 | 9/1966 | Forehand | 244—138 |
| 3,310,261 | 3/1967 | Rogallo et al. | 244—44 |
| 3,269,674 | 8/1966 | Girard | 244—48 |

OTHER REFERENCES

Aviation Week and Space Technology, Jan. 27, 1964, cover page and p. 89.

FERGUS S. MIDDLETON, *Primary Examiner.*

MILTON BUCHLER, *Examiner.*

B. BELKIN, *Assistant Examiner.*